(12) United States Patent
Takata et al.

(10) Patent No.: US 11,842,192 B2
(45) Date of Patent: Dec. 12, 2023

(54) ARITHMETIC PROCESSING DEVICE AND SEMICONDUCTOR DEVICE WITH IMPROVED INSTRUCTION RETRY

(71) Applicant: FUJITSU LIMITED, Kawasaki (JP)

(72) Inventors: Yuhei Takata, Kawasaki (JP); Shiro Kamoshida, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 17/203,000

(22) Filed: Mar. 16, 2021

(65) Prior Publication Data

US 2021/0382715 A1    Dec. 9, 2021

(30) Foreign Application Priority Data

Jun. 4, 2020    (JP) ................. 2020-097824

(51) Int. Cl.
    *G06F 9/30*    (2018.01)
    *G06F 9/38*    (2018.01)
(52) U.S. Cl.
    CPC ........ *G06F 9/3001* (2013.01); *G06F 9/30076* (2013.01); *G06F 9/3836* (2013.01)
(58) Field of Classification Search
    CPC .................................................. G06F 9/3001
    See application file for complete search history.

(56) References Cited

U.S. PATENT DOCUMENTS

| | | | | |
|---|---|---|---|---|
| 10,282,250 B1 * | 5/2019 | Banerjee | ............... | G06F 3/0659 |
| 2016/0170764 A1 * | 6/2016 | Col | ................. | G06F 9/30043 |
| | | | | 712/217 |

FOREIGN PATENT DOCUMENTS

JP    2007-148467 A    6/2007

* cited by examiner

*Primary Examiner* — Michael J Metzger
(74) *Attorney, Agent, or Firm* — WHDA, LLP

(57) ABSTRACT

An arithmetic processing device, includes a memory; and a processor coupled to the memory and the processor configured to: execute arithmetic processing which executes a plurality of instructions issued out of order, execute control processing which commits the plurality of instructions for which execution has been completed in order, identify, for each instruction included in the plurality of instructions, a count value which indicates a number of cycles from when execution of the instruction has been completed, and identify, among a plurality of uncommitted instructions, the instruction with the count value which matches the number of cycles in which an error is detected in the arithmetic processing as a specific instruction to be retried.

9 Claims, 17 Drawing Sheets

FIG. 2

| EFLG | CNT | INST |
|------|-----|------|
|      |     |      |
|      |     |      |
|      |     |      |
|      |     |      |
|      |     |      |
|      |     |      |
|      |     |      |

FIG. 6

| ERROR SIGNAL NAME | PINF | CNT |
|---|---|---|
| REUTa | 0 | 1 |
| REUTb | 1 | 1 |
| REUT2a | 0 | 2 |
| REUT2b | 1 | 2 |

| EFLG | PINF | CNT | INST |
|------|------|-----|------|
|      |      |     |      |
|      |      |     |      |
|      |      |     |      |
|      |      |     |      |
|      |      |     |      |
|      |      |     |      |

13A
ENT

FIG. 8

(a) INPUT INSTRUCTIONS (C AND D) AND INSTRUCTIONS (A AND B) IN THIS ORDER

13A

| EFLG | PINF | CNT | INSTRUCTION INFORMATION | CYCLE |
|---|---|---|---|---|
| | 0 | 0 | INSTRUCTION A | U |
| | 1 | 0 | INSTRUCTION B | U |
| | 0 | 1 | INSTRUCTION C | UT |
| | 1 | 1 | INSTRUCTION D | UT |

ENT (b)

| EFLG | PINF | CNT | INSTRUCTION INFORMATION | CYCLE |
|---|---|---|---|---|
| | 0 | 1 | INSTRUCTION A | UT |
| | 1 | 1 | INSTRUCTION B | UT |
| | 0 | 2 | INSTRUCTION C | UT2 |
| | 1 | 2 | INSTRUCTION D | UT2 |

(c)

| EFLG | PINF | CNT | INSTRUCTION INFORMATION | CYCLE |
|---|---|---|---|---|
| | 1 | 2 | INSTRUCTION B | UT2 |
| | 0 | 3 | INSTRUCTION C | UT3 |
| | 1 | 3 | INSTRUCTION D | UT3 |

(d)

| EFLG | PINF | CNT | INSTRUCTION INFORMATION | CYCLE |
|---|---|---|---|---|
| | | | | |
| | | | | |
| | 0 | 4 | INSTRUCTION C | UT4 |
| | 1 | 4 | INSTRUCTION D | UT4 |

(e)

| EFLG | PINF | CNT | INSTRUCTION INFORMATION | CYCLE |
|---|---|---|---|---|
| | | | | |
| | | | | |
| | | | | |
| | 1 | 5 | INSTRUCTION D | UT5 |

FIG. 9

INPUT INSTRUCTIONS (C AND D) AND
INSTRUCTIONS (A AND B) IN THIS ORDER (a) 13A

| EFLG | PINF | CNT | INSTRUCTION INFORMATION | CYCLE |
|---|---|---|---|---|
|  | 0 | 0 | INSTRUCTION A | U |
|  | 1 | 0 | INSTRUCTION B | U |
|  | 0 | 1 | INSTRUCTION C | UT |
|  | 1 | 1 | INSTRUCTION D | UT |

ENT (b)

| EFLG | PINF | CNT | INSTRUCTION INFORMATION | CYCLE |
|---|---|---|---|---|
|  | 0 | 1 | INSTRUCTION A | UT |
|  | 1 | 1 | INSTRUCTION B | UT |
|  | 0 | 2 | INSTRUCTION C | UT2 |
| 1 | 1 | 2 | INSTRUCTION D | UT2 |

(c)

| EFLG | PINF | CNT | INSTRUCTION INFORMATION | CYCLE |
|---|---|---|---|---|
|  | 1 | 2 | INSTRUCTION B | UT2 |
|  | 0 | 3 | INSTRUCTION C | UT3 |
| 1 | 1 | 3 | INSTRUCTION D | UT3 |

(d)

| EFLG | PINF | CNT | INSTRUCTION INFORMATION | CYCLE |
|---|---|---|---|---|
|  |  |  |  |  |
|  |  |  |  |  |
|  | 0 | 1 | INSTRUCTION C | UT4 |
| 1 | 1 | 1 | INSTRUCTION D | UT4 |

FIG. 10

INPUT INSTRUCTIONS (C AND D) AND
INSTRUCTIONS (A AND B) IN THIS ORDER (a)

| | | | | ~13A |
|---|---|---|---|---|
| EFLG | PINF | CNT | INSTRUCTION INFORMATION | CYCLE |
|  | 0 | 0 | INSTRUCTION A | UT |
|  | 1 | 0 | INSTRUCTION B | UT |
|  | 0 | 1 | INSTRUCTION C | UT |
|  | 1 | 1 | INSTRUCTION D | UT |

ENT (b)

| EFLG | PINF | CNT | INSTRUCTION INFORMATION | CYCLE |
|---|---|---|---|---|
|  | 0 | 1 | INSTRUCTION A | UT |
| 1 | 1 | 1 | INSTRUCTION B | UT |
|  | 0 | 2 | INSTRUCTION C | UT2 |
| 1 | 1 | 2 | INSTRUCTION D | UT2 |

(c)

| EFLG | PINF | CNT | INSTRUCTION INFORMATION | CYCLE |
|---|---|---|---|---|
|  | 1 | 2 | INSTRUCTION B | UT2 |
| 1 | 0 | 3 | INSTRUCTION C | UT3 |
| 1 | 1 | 3 | INSTRUCTION D | UT3 |

FIG. 11

INPUT INSTRUCTIONS (C AND D) AND
INSTRUCTIONS (A AND B) IN THIS ORDER (a) 13A

| EFLG | PINF | CNT | INSTRUCTION INFORMATION | CYCLE |
|---|---|---|---|---|
|  | 0 | 0 | INSTRUCTION A | U |
|  | 1 | 0 | INSTRUCTION B | U |
|  | 0 | 1 | INSTRUCTION C | UT |
|  | 1 | 1 | INSTRUCTION D | UT |

ENT (b)

| EFLG | PINF | CNT | INSTRUCTION INFORMATION | CYCLE |
|---|---|---|---|---|
|  | 0 | 1 | INSTRUCTION A | UT |
| 1 | 1 | 1 | INSTRUCTION B | UT |
| 1 | 0 | 2 | INSTRUCTION C | UT2 |
|  | 1 | 2 | INSTRUCTION D | UT2 |

INSTRUCTION A BECOMES NON-RETRY
ERROR BECAUSE ALREADY COMMITTED (c)

| EFLG | PINF | CNT | INSTRUCTION INFORMATION | CYCLE |
|---|---|---|---|---|
| 1 | 1 | 2 | INSTRUCTION B | UT2 |
| 1 | 0 | 3 | INSTRUCTION C | UT3 |
|  | 1 | 3 | INSTRUCTION D | UT3 |

FIG. 12

ARITHMETIC PROCESSING DEVICE AND SEMICONDUCTOR DEVICE WITH IMPROVED INSTRUCTION RETRY

CROSS-REFERENCE TO RELATED APPLICATION

This application is based upon and claims the benefit of priority of the prior Japanese Patent Application No. 2020-97824, filed on Jun. 4, 2020, the entire contents of which are incorporated herein by reference.

FIELD

The embodiments discussed herein relate to an arithmetic processing device and a semiconductor device.

BACKGROUND

An information processing device including a processor and a transaction control unit that executes out-of-order processing for changing transactions sequentially issued from the processor is known. In a case where a failure occurs during transaction processing, the transaction control unit determines necessity of retry processing of another transaction together with a retry of the transaction being processed in order to maintain coherency. For example, Japanese Laid-open Patent Publication No. 2007-148467 and the like are disclosed as related art.

SUMMARY

According to an aspect of the embodiments, an arithmetic processing device, includes a memory; and a processor coupled to the memory and the processor configured to: execute arithmetic processing which executes a plurality of instructions issued out of order, execute control processing which commits the plurality of instructions for which execution has been completed in order, identify, for each instruction included in the plurality of instructions, a count value which indicates a number of cycles from when execution of the instruction has been completed, and identify, among a plurality of uncommitted instructions, the instruction with the count value which matches the number of cycles in which an error is detected in the arithmetic processing as a specific instruction to be retried.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is an explanatory diagram illustrating an example of an entry buffer in FIG. 1;

FIG. 6 is an explanatory diagram illustrating an example of an entry determination table in FIG. 5;

FIG. 7 is an explanatory diagram illustrating an example of an entry buffer in FIG. 5;

FIG. 8 is an explanatory diagram illustrating an example of an operation of a CPU in FIG. 5 as a state transition of the entry buffer;

FIG. 9 is an explanatory diagram illustrating another example of the operation of the CPU in FIG. 5 as a state transition of the entry buffer;

FIG. 10 is an explanatory diagram illustrating still another example of the operation of the CPU in FIG. 5 as a state transition of the entry buffer;

FIG. 11 is an explanatory diagram illustrating another example of the operation of the CPU in FIG. 5 as a state transition of the entry buffer;

FIG. 12 is an explanatory diagram illustrating another example of the operation of the CPU in FIG. 5 as a state transition of the entry buffer;

DESCRIPTION OF EMBODIMENTS

By the way, in an arithmetic unit of a semiconductor device, such as a processor, there is a possibility of inversion of a bit value of data being operated due to a soft error, an increase in propagation delay time, a hardware failure, or the like when executing an instruction. In the case of detecting the inversion (error) of the bit value, the arithmetic unit notifies an instruction control unit that has issued the instruction to the arithmetic unit of the error. For example, the arithmetic unit notifies the instruction control unit of the error together with information indicating a cycle of detecting the error.

The instruction control unit reissues the instruction to the arithmetic unit from which the information indicating the retryable cycle has been received, and causes the arithmetic unit to retry the instruction. This cancels, for example, an error that has transiently occurred due to a soft error, an increase in propagation delay time between flip-flops by a temporary drop in power supply voltage, or the like. Meanwhile, in the case of receiving information indicating a non-retryable cycle, the instruction control unit does not reissue the instruction and notifies a higher management device that manages the semiconductor device of occurrence of the error. The management device detects the failure of the semiconductor device on the basis of the notification of the error, and stops the operation of the semiconductor device, for example.

For example, the instruction control unit issues an instruction to the arithmetic unit out of order, and commits the instruction executed by the arithmetic unit in order. In the out-of-order instruction issuance control, in a case where a commit of the instruction that has caused an error determined to be non-retryable is waited until execution of another instruction is completed, the instruction may become retryable. However, in the architecture that determines whether an instruction is retryable according to the cycle of detecting an error without considering the order of commits, the instruction determined to be non-retryable is not retried, and the management device is notified of the error. In the case where an instruction that becomes retryable by changing the order of commits during out-of-order execution is determined to be non-retryable, the processing performance and reliability of the semiconductor device deteriorate, and the processing performance and reliability of the system including the semiconductor device deteriorate.

In view of the foregoing, it is desirable to suppress a retryable instruction being determined to be non-retryable.

Hereinafter, embodiments will be described with reference to the drawings. Hereinafter, a reference code that is the same as a name of a signal is used for a signal line in which the signal and the like are transmitted.

Figure 1:
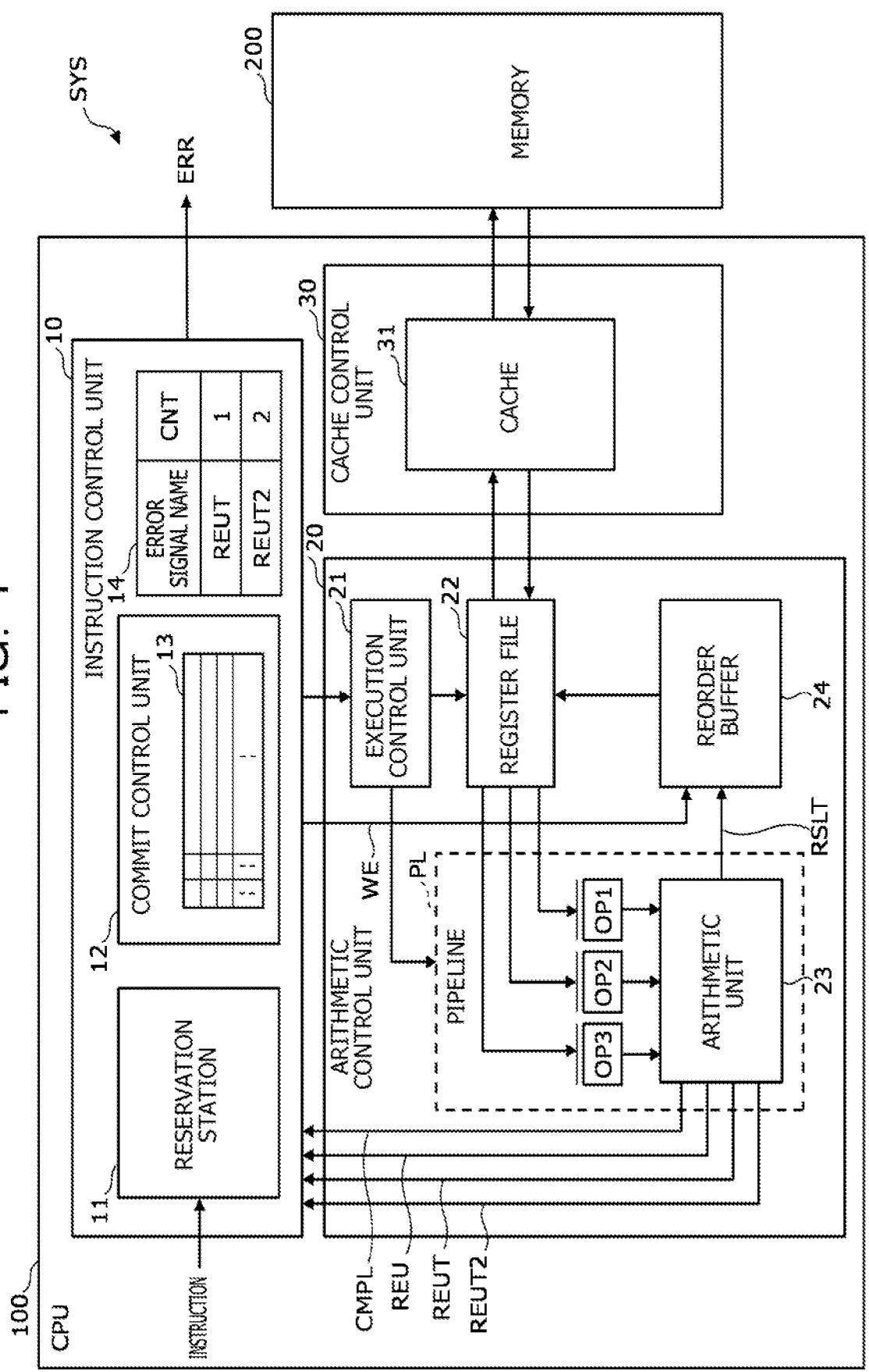
FIG. 1 is a block diagram illustrating an example of a semiconductor device according to an embodiment.

FIG. 1 illustrates an example of a semiconductor device according to an embodiment. A semiconductor device 100 illustrated in FIG. 1 is, for example, a processor such as a central processing unit (CPU), and is mounted on a system SYS together with a memory 200 such as a main memory. Hereinafter, the semiconductor device 100 is also referred to as a CPU 100. The CPU 100 includes an instruction control unit 10, an arithmetic control unit 20, and a cache control unit 30. Note that the CPU 100 includes an instruction decoder that decodes an instruction, but the illustration is omitted.

The instruction control unit 10 includes a reservation station 11, a commit control unit 12, and an entry determination table 14. The arithmetic control unit 20 includes an execution control unit 21, a register file 22, a plurality of operand registers OP (OP1 to OP3), an arithmetic unit 23, and a reorder buffer 24. The cache control unit 30 includes a cache 31. A completion signal line CMPL and error signal lines REU, REUT, and REUT2 are wired between the arithmetic unit 23 and the instruction control unit 10 (commit control unit 12).

The reservation station 11 includes a plurality of entries (not illustrated) that holds instructions in a decoded order by the instruction decoder. The reservation station 11 outputs the instructions held in the entries to the execution control unit 21 out of order in an executable order. The reservation station 11 is an example of an instruction issuance unit.

Figure 2:
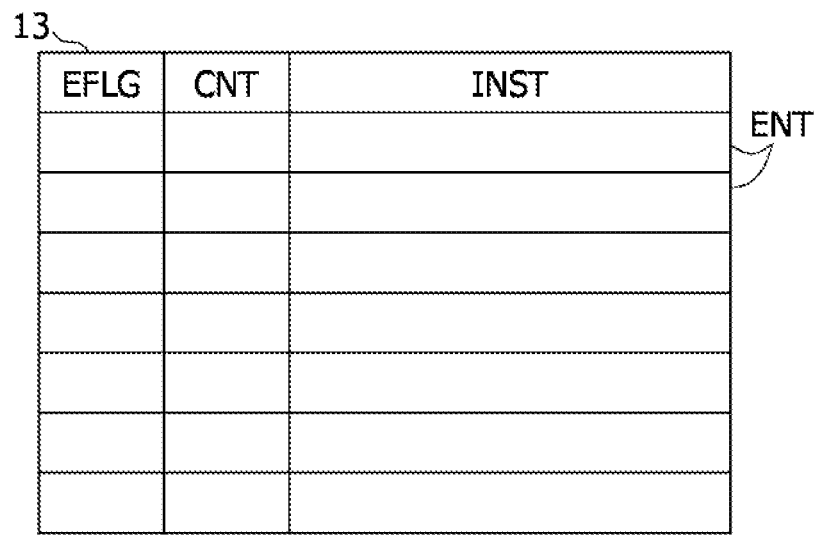

The commit control unit 12 includes an entry buffer 13 including a plurality of entries each holding information indicating an instruction for which execution has been completed by the arithmetic control unit 20. The commit control unit 12 executes control for committing an instruction in order, execution of the instruction having been completed out of order. The commit control unit 12 outputs a write enable signal WE indicating an instruction to be committed to the reorder buffer 24, and transfers an operation result RSLT held by the reorder buffer 24 to the register file 22. Here, a commit of an instruction means that the operation result RSLT is transferred to the register file 22 by the instruction control unit 10, and the instruction is completed. The entry buffer 13 is an example of a holding unit. An example of the entry buffer 13 is illustrated in FIG. 2.

The entry determination table 14 respectively holds count values CNT "1" and "2" (fixed values) corresponding to error signals REUT and REUT2 to be output to the error signal lines REUT and REUT2 in a case where the arithmetic unit 23 detects an error. The count value CNT held in the entry determination table 14 indicates a detection cycle in which an error has been detected (a cycle count from the completion of execution of an instruction). The error signals REUT and REUT2 will be described with reference to FIG. 3.

Figure 3:
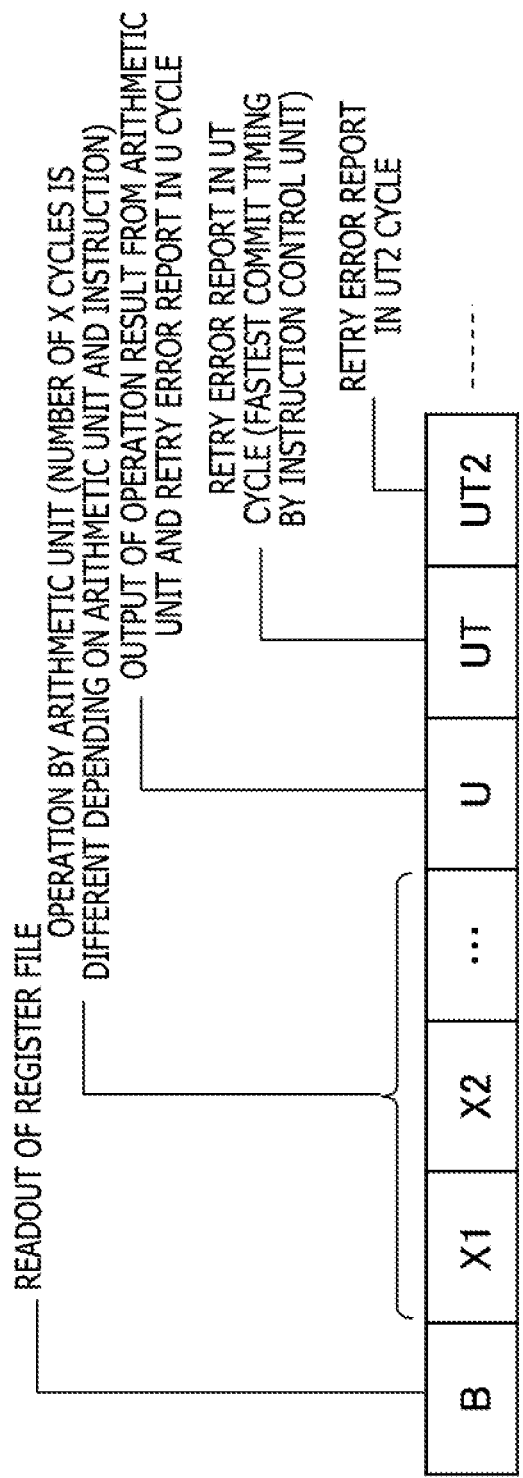
FIG. 3 is an explanatory diagram illustrating an example of an execution cycle of a pipeline in FIG. 1.

In the arithmetic control unit 20, the execution control unit 21 determines the arithmetic unit 23 to which the instruction supplied from the reservation station 11 is input, and determines a register to be used for an operation in the register file 22. Then, the execution control unit 21 inputs the instruction to a pipeline PL including the operand registers OP and the arithmetic unit 23. The pipeline PL executes instructions using a plurality of execution cycles, as illustrated in FIG. 3.

The register file 22 includes a plurality of registers each holding data (operand) used for an operation and an operation result. The operands held by the register file 22 are transferred from the cache 31, and the operation result held by the register file 22 is transferred to the cache 31. The cache 31 stores a part of data held by the memory 200. In a case where data to be operated by the arithmetic unit 23 is stored in the cache 31 (cache hit), the data read from the cache 31 is transferred to the register file 22. On the other hand, in a case where the data to be operated by the arithmetic unit 23 is not stored in the cache 31 (cache miss), the data read from the memory 200 to the cache 31 is transferred to the register file 22.

The arithmetic unit 23 executes an operation using the operands held in the operand registers OP. The arithmetic unit 23 outputs a completion signal CMPL to the instruction control unit 10 via the completion signal line CMPL on the basis of the completion of the operation, and stores the operation result RSLT in the reorder buffer 24. As will be described in FIG. 3, in a case of detecting an error at the execution of the operation, the arithmetic unit 23 outputs the error signal REU (REUT or REUT2) indicating the execution cycle in which the error has been detected to the instruction control unit 10 via the error signal line REU (REUT or REUT2).

For example, in a case of detecting inversion of a bit value of the data (a logical value different from an expected value) during the operation, the arithmetic unit 23 detects an error. The arithmetic unit 23 is an example of an arithmetic unit that executes an instruction issued by the reservation station 11. Note that FIG. 1 illustrates only one arithmetic unit 23, but the arithmetic control unit 20 may include a plurality of arithmetic units 23 or may include a plurality of types of arithmetic units 23. Furthermore, the operands supplied to the arithmetic unit 23 are not limited to three.

The reorder buffer 24 includes a plurality of entries that temporarily holds the operation result RSLT until the instruction is committed. The reorder buffer 24 stores the operation result RSLT to be committed in the register file 22 on the basis of the write enable signal WE from the commit control unit 12.

The cache control unit 30 transfers the operands from the cache 31 to the register file 22 or transfers the operation result RSLT from the register file 22 to the cache 31 on the basis of the instruction from the execution control unit 21. In the case where the data to be used for the operation is not in the cache 31, the cache control unit 30 reads the data from the memory 200, stores the read data in the cache 31, and transfers the read data to the register file 22. Note that the cache 31 may hold not only data but also instructions. Furthermore, the CPU 100 may be directly connected to the memory 200 without having the cache control unit 30 and the cache 31.

FIG. 2 illustrates an example of the entry buffer 13 in FIG. 1. The entry buffer 13 includes a plurality of entries ENT each holding an error flag EFLG, a count area CNT, and an instruction information area INST. The error flag EFLG is an example of error information. Hereinafter, a value stored in the count area CNT is also referred to as a count value CNT, and information stored in the instruction information area INST is also referred to as instruction information INST or an instruction.

In a case of receiving the completion signal CMPL, the commit control unit 12 stores the instruction information INST indicating the instruction corresponding to the completion signal CMPL to one of the entries ENT. Furthermore, the commit control unit 12 resets the count area CNT of the entry ENT in which the instruction information INST has been stored to "0". Hereinafter, the value held by the count area CNT is also referred to as the count value CNT. The commit control unit 12 updates (for example, increments) the count value CNT reset to "0" every time one cycle of the pipeline PL elapses. Note that the commit control unit 12 knows the input order of the instructions input to the arithmetic control unit 20 by the reservation station 11, and can identify the instruction corresponding to the completion signal CMPL (the instruction for which execution of the operation has been completed). Hereinafter, information indicating an instruction is also referred to as the instruction information INST.

In a case of receiving the error signal REU together with the completion signal CMPL from the arithmetic unit 23, the commit control unit 12 determines that an error has occurred in the instruction for which execution of the operation has been completed by the completion signal CMPL. In this case, the commit control unit 12 sets the error flag EFLG of the entry ENT storing the instruction information INST indicating the instruction in which an error has occurred to "1", for example.

In the case of receiving the error signal REUT (or REUT2), the commit control unit 12 refers to the entry determination table 14 and reads the count value CNT corresponding to the error signal REUT (or REUT2). The commit control unit 12 sets the error flag EFLG of the entry ENT that holds the read count value CNT. Then, the commit control unit 12 determines that the instruction information INST held by the entry ENT with the set error flag EFLG is the instruction in which an error has occurred. A method of determining the instruction in which an error has occurred, using the entry determination table 14, will be described with reference to FIG. 3.

Note that, in a case where the entry ENT that holds the count value CNT read from the entry determination table 14 is not present in the entry buffer 13, the commit control unit 12 detects that a non-retryable error (non-retry error) has occurred in the arithmetic unit 23. In this case, the commit control unit 12 notifies a management device that manages the CPU 100 of an error ERR.

FIG. 3 illustrates an example of the execution cycle of the pipeline PL in FIG. 1. The pipeline PL includes a buffer cycle B, a predetermined number of execution cycles X (X1, X2, . . . ), and a plurality of update cycles U, UT, UT2, . . . in the execution order. Each of the cycles B, X, U, UT, UT2, . . . is completed in one clock cycle.

In the B cycle, the operands are read from the register file 22 to the pipeline PL. In the X (X1, X2, . . . ) cycle, the arithmetic unit 23 executes the operation. The number of X cycles varies depending on the type of arithmetic unit 23 and the type of the instruction, and the number of X cycles is larger for the instruction that executes a complicated operation.

The U cycle indicates the completion of the operation by the arithmetic unit 23, the completion signal CMPL is output, and the operation result RSLT by the arithmetic unit 23 is output to the reorder buffer 24. In a case of detecting an error before the U cycle is completed, the arithmetic unit 23 outputs the error signal REU in the U cycle, and notifies the instruction control unit 10 of the occurrence of the retryable error. Therefore, the arithmetic unit 23 holds the error detected in the X cycle (X1 or X2, or the like) until the U cycle, for example.

As described above, the commit control unit 12 knows the input order of the instructions input to the arithmetic control unit 20 by the reservation station 11, and can identify the instruction corresponding to the completion signal CMPL. Therefore, in the case of receiving the error signal REU together with the completion signal CMPL, the commit control unit 12 sets the error flag EFLG of the entry ENT storing the instruction information INST corresponding to the completion signal CMPL in the entry buffer 13. At this time, the commit control unit 12 does not refer to the entry determination table 14.

The UT cycle is the fastest commit timing of each instruction by the instruction control unit 10. For example, an instruction having no dependency on another instruction is committed in the UT cycle. In the case of detecting an error in the UT cycle, the arithmetic unit 23 outputs the error signal REUT to notify the instruction control unit 10 of the occurrence of the retryable error.

In the case of receiving the error signal REUT from the arithmetic unit 23, the commit control unit 12 refers to the entry determination table 14 and reads the count value CNT (="1") held by the entry determination table 14 corresponding to the error signal REUT. Then, the commit control unit 12 sets the error flag EFLG of the entry ENT with the count value CNT of "1" in the entry buffer 13.

The count value CNT of the entry buffer 13 is set to the count value CNT of "0" in the U cycle, and is then incremented by "1" every time the cycle progresses. Therefore, in the cycle in which the error signal REUT is received, the commit control unit 12 can determine that the instruction information INST held in the entry ENT with the count value CNT of "1" indicates the instruction that has caused the error. That is, in the case of receiving the error signal REUT, the commit control unit 12 can set the error flag EFLG to the entry holding the instruction that has caused the error by referring to the entry determination table 14 and searching the entry buffer 13.

The UT2 cycle and the subsequent cycles are added every time the commit timing of each instruction is delayed. The delay in the commit timing occurs when an instruction in a later description order of a program (instruction sequence) is executed before an instruction in an earlier description order by out-of-order execution and waits for a commit. In the case of detecting an error in the UT2 cycle, the arithmetic unit 23 outputs the error signal REUT2 to notify the instruction control unit 10 of the occurrence of the error.

In the case of receiving the error signal REUT2 from the arithmetic unit 23, the commit control unit 12 refers to the entry determination table 14 and reads the count value CNT (="2") held by the entry determination table 14 corresponding to the error signal REUT2. Then, the commit control unit 12 sets the error flag EFLG of the entry ENT with the count value CNT of "2" in the entry buffer 13.

As described above, the count value CNT of the entry buffer 13 is set to "0" in the U cycle, and is then incremented by "1" every time the cycle progresses. Therefore, in the cycle in which the error signal REUT2 is received, the commit control unit 12 can determine that the instruction information INST held in the entry ENT with the count value CNT of "2" indicates the instruction that has caused the error. That is, in the case of receiving the error signal REUT2, the commit control unit 12 can set the error flag EFLG to the entry holding the instruction that has caused the error by referring to the entry determination table 14 and searching the entry buffer 13.

Since the instruction corresponding to the entry ENT with the error flag EFLG set according to the error signal REUT2 is not committed, the instruction is retryable. Meanwhile, in the case where the entry ENT holding the count value CNT="2" is not present when the error signal REUT2 is output, the instruction that caused the error signal REUT2 has already been committed. In this case, the commit control unit 12 detects that the non-retryable error (non-retry error) has occurred on the basis of the reception of the error signal REUT2, and outputs the error ERR.

Note that the arithmetic unit 23 of the present embodiment does not detect an error in a cycle after the UT2 cycle (for example, in the UT3 cycle) (designed in such a manner). Therefore, as illustrated in FIG. 1, the signal lines for transmitting the error signals REU, REUT, and REUT2 are wired from the arithmetic unit 23 to the instruction control unit 10, and a signal line for notifying the error occurring in or after the UT3 is not wired. On the contrary, in a case where the arithmetic unit 23 detects an error even in the UT3 cycle, the signal line for transmitting an error signal REUT3 (not illustrated) from the arithmetic unit 23 to the instruction control unit 10 is added.

Figure 4:
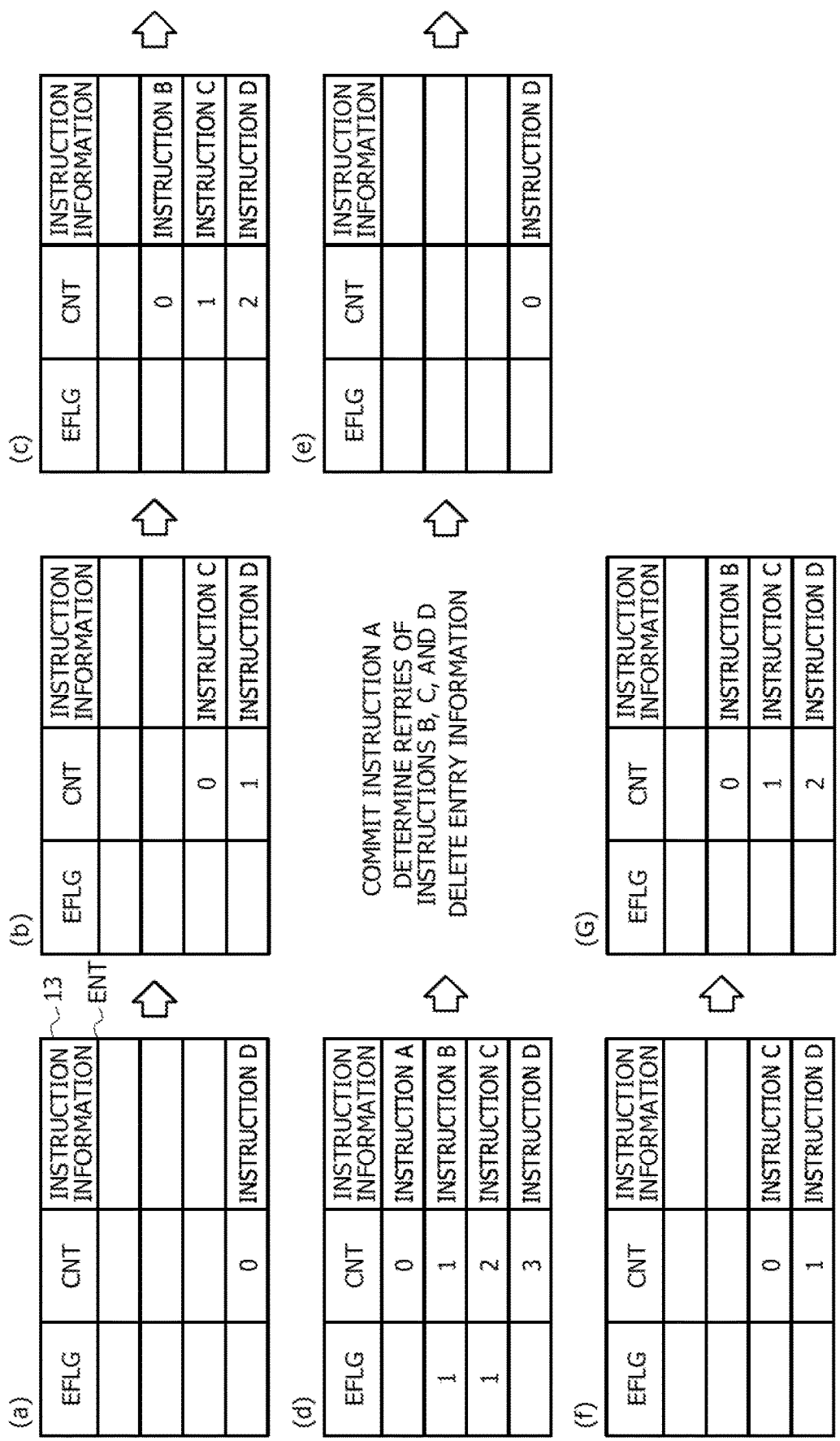
FIG. 4 is an explanatory diagram illustrating an example of an operation of a CPU in FIG. 1 as a state transition of the entry buffer.

FIG. 4 illustrates an example of the operation of the CPU 100 in FIG. 1 as a state transition of the entry buffer 13. In FIG. 4, instructions A, B, C, and D are sequentially decoded, and the reservation station 11 sequentially inputs instructions D, C, B, and A to the arithmetic control unit 20 in consideration of data dependency.

Thereafter, in (a) of FIG. 4, the commit control unit 12 stores the instruction D and the count value CNT of "0" in one of the entries ENT on the basis of the completion signal CMPL (U cycle) of the instruction D.

Next, in (b) of FIG. 4, the commit control unit 12 stores the instruction C and the count value CNT of "0" in one of the entries ENT on the basis of the completion signal CMPL (U cycle) of the instruction C. Furthermore, the commit control unit 12 increments the count value CNT of the entry ENT that holds the instruction D. The commit control unit 12 suppresses the commit of instruction D because the instruction D enters the UT cycle that is the commit cycle, but the instructions A, B, and C in the earlier description order of the program have not yet been committed.

Next, in (c) of FIG. 4, the commit control unit 12 stores the instruction B and the count value CNT of "0" in one of the entries ENT on the basis of the completion signal CMPL of the instruction B. Furthermore, the commit control unit 12 increments the respective count values CNT of the entries ENT holding the instructions C and D, and sets the count values CNT to "1" and "2". The commit control unit 12 suppresses the commit of the instructions C and D because the instructions A and B in the earlier description order have not yet been committed.

Next, in (d) of FIG. 4, the commit control unit 12 stores the instruction A and the count value CNT of "0" in one of the entries ENT on the basis of the completion signal CMPL of the instruction A. The commit control unit 12 increments the respective count values CNT of the entries ENT holding the instructions B, C, and D. The commit control unit 12 suppresses the commit of the instructions B, C, and D because the instruction A in the earlier description order has not yet been committed.

Furthermore, the commit control unit 12 receives the error signal REUT indicating occurrence of an error in the UT cycle and the error signal REUT2 indicating occurrence of an error in the UT2 cycle. The commit control unit 12 refers to the entry holding the error signal REUT in the entry determination table 14, and sets the error flag EFLG of the entry ENT holding the instruction B with the count value CNT of "1" to "1". Furthermore, the commit control unit 12 refers to the entry holding the error signal REUT2 in the entry determination table 14, and sets the error flag EFLG of the entry ENT holding the instruction C with the count value CNT of "2" to "1". As described above, in the case of receiving the error signal REUT (or REUT2), the commit control unit 12 detects the instruction in which an error has occurred by referring to the entry determination table 14 and can set the error flag EFLG.

The commit control unit 12 commits the instruction A in the UT cycle because execution of the instruction A with the earliest description order of the program has been normally completed. As a result, the operation result RSLT of the instruction A is transferred from the reorder buffer 24 to the register file 22. Meanwhile, the commit control unit 12 determines that the instructions B and C are retryable because the commit control unit 12 has not committed the instruction B with an error that has occurred in the UT cycle and the instruction C with an error that has occurred in the UT2 cycle. Furthermore, the commit control unit 12 determines that the instruction D in the UT3 cycle without being committed is retryable.

Then, the commit control unit 12 determines retry of the instructions B, C, and D, and requests the reservation station 11 to reissue the instructions B, C, and D. Furthermore, the commit control unit 12 deletes (flashes) the information of the instructions B, C, and D to be retried from the entry buffer 13. The reservation station 11 issues the instructions D, C, and B to the arithmetic control unit 20 in this order, and causes the arithmetic unit 23 to retry the instructions D, C, and B.

In (e), (f), and (g) of FIG. 4, the commit control unit 12 stores the instruction information and the count value CNT in the entry buffer 13 each time the completion signals CMPL of the instructions D, C, and B are received, similarly to (a), (b), and (c) of FIG. 4. The commit control unit 12 does not receive the error signals REU, REUT, and REUT2 due to execution of the instructions D, C, and B. Therefore, the commit control unit 12 commits the instruction B when the instruction B enters the UT cycle, and then commits instructions C and D in sequence. That is, the instruction C is committed in the UT2 cycle and the instruction D is committed in the UT3 cycle. Then, the operation illustrated in FIG. 4 is completed.

Note that, in a case where an error occurs a predetermined number of times (for example, three times in a row) with the same instruction, the commit control unit 12 detects occurrence of a non-retryable error (failure of hardware or the like) even in an uncommitted instruction, and notifies the management device of the error ERR (non-retry error).

For example, in the past, in the case of receiving the error signal in the UT2 cycle of the instruction C waiting for a commit due to data dependency, the error ERR (non-retry error) has been notified to the management device that manages the CPU 100, informing that a non-retryable error has occurred in the instruction C. However, the error in the UT2 cycle of the instruction C waiting for a commit due to the data dependency is a retryable error (pseudo non-retry error). In the present embodiment, the instruction in which the pseudo non-retry error has occurred, which used to be determined to be non-retryable, can be retried. As a result, the reliability of the system SYS including the CPU 100 can be improved, and the processing performance can be improved.

Furthermore, for example, in a case where the instructions B and C have no data dependency, and the instruction C is earlier than the instruction B in the description order, the instruction C is committed and the information is deleted from the entry buffer 13 in (c) of FIG. 4. After that, in a case where the error signal REUT2 of the instruction C is output, the count value CNT="2" held by the entry determination table 14 corresponding to the error signal REUT2 is not held in any of the entries ENT of the entry buffer 13. In this case, since the commit control unit 12 is not able to execute the retry of the committed instruction C, the commit control unit 12 determines that a non-retryable error (non-retry error) has occurred due to the execution of the instruction C, and notifies the management device of the error ERR.

As described above, by determining whether the count value CNT matching the count value CNT of the entry determination table 14 is present in the entry buffer 13, the retryable error and the non-retryable error can be distinguished. Therefore, occurrence of the non-retry error can be detected by a simple method while suppressing occurrence of the pseudo non-retry error in which the retryable instruction is determined to be non-retryable. As a result, the reliability of the system SYS including the CPU 100 can be improved, and the processing performance can be improved.

As described above, in the present embodiment, the count value CNT indicating the cycle count after completion of execution of an instruction is counted for each instruction. Thereby, an instruction having the count value CNT matching the detection cycle of the error indicated by the error signal REU, REUT, or REUT2 can be determined to be retryable. Then, by committing committable instructions excluding the instruction determined to be retryable, and determining retry of a non-committed instruction, the non-retry error having occurred in the UT2 cycle being detected as a non-retryable error can be suppressed, for example.

In the case where the count value CNT that is the same as the detection cycle in which an error has been detected is not present in any of the entries ENT of the entry buffer 13, the commit control unit 12 can determine that the instruction in which an error has occurred is a non-retryable error (non-retry error). That is, by determining whether there is an entry ENT having the count value CNT matching the detection cycle, whether the error signal REUT2 indicates a retryable error or a non-retryable error can be distinguished.

Therefore, occurrence of the non-retry error can be detected by a simple method while suppressing occurrence of the pseudo non-retry error in which the retryable instruction is determined to be non-retryable. As a result, the reliability of the system SYS including the CPU 100 can be improved, and the processing performance can be improved.

By holding the count value CNT and the error flag EFLG in the entry buffer 13 for each instruction, the retryable instruction can be individually determined at the time of receiving the error signal REU, REUT, or REUT2. Furthermore, the instruction to be committed by the entry buffer 13 and the instruction to be retried can be easily distinguished. By searching the entry buffer 13 using the entry determination table 14, the instruction in which an error has occurred can be detected on the basis of the error signal line (REUT or the like) that has transmitted the error signal, and the error flag EFLG can be set in the entry buffer 13.

Figure 5:
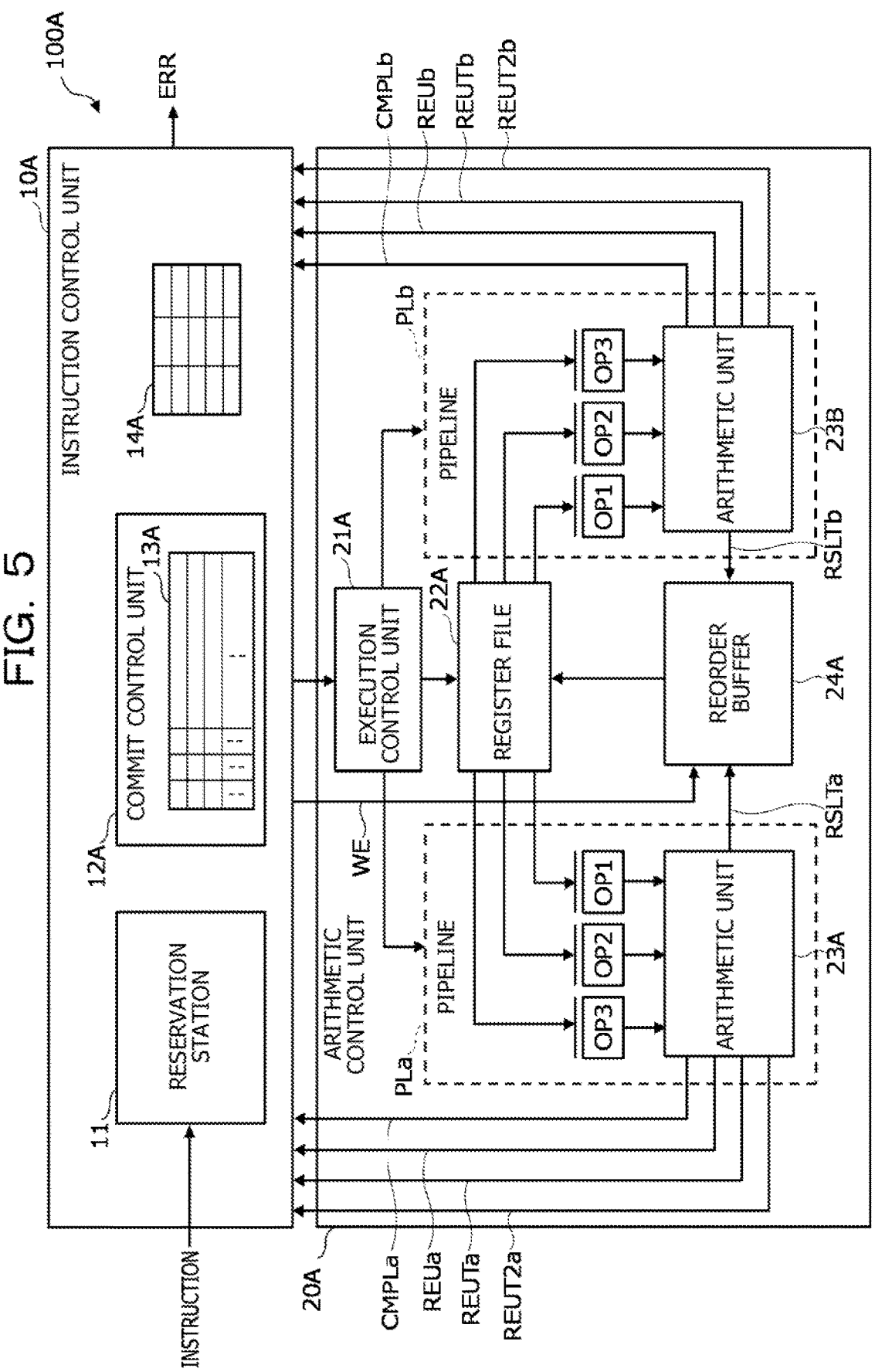
FIG. 5 is a block diagram illustrating an example of a semiconductor device according to another embodiment.

FIG. 5 illustrates an example of a semiconductor device according to another embodiment. Elements similar to those in FIG. 1 are denoted by the same reference numerals, and detailed description is omitted. A semiconductor device 100A illustrated in FIG. 5 is, for example, a processor such as a CPU, and is mounted on a system together with a memory such as a main memory (not illustrated). Hereinafter, the semiconductor device 100A is also referred to as a CPU 100A. The CPU 100A includes an instruction control unit 10A and an arithmetic control unit 20A. Note that the CPU 100A may include a cache control unit 30 including a cache 31 connected to a memory, similarly to the CPU 100 illustrated in FIG. 1.

The instruction control unit 10A includes a reservation station 11, a commit control unit 12A, and an entry determination table 14A. An example of the entry determination table 14A is illustrated in FIG. 6. The arithmetic control unit 20A includes an execution control unit 21A, a register file 22A, a plurality of pipelines PL (PLa and PLb), and a reorder buffer 24A.

The pipelines PLa and PLb have the same configuration as each other, for example, and each includes a plurality of operand registers OP (OP1 to OP3) and an arithmetic unit 23 (23A or 23B). The pipelines PLa and PLb can execute instructions in parallel. Each pipeline PL may include a plurality of arithmetic units 23 or may include a plurality of types of arithmetic units 23, and the number of operand registers OP is not limited to three. An execution cycle of each pipeline PL is the same as in FIG. 3. Note that the number of pipeline PLs may be three or more.

Figure 7:
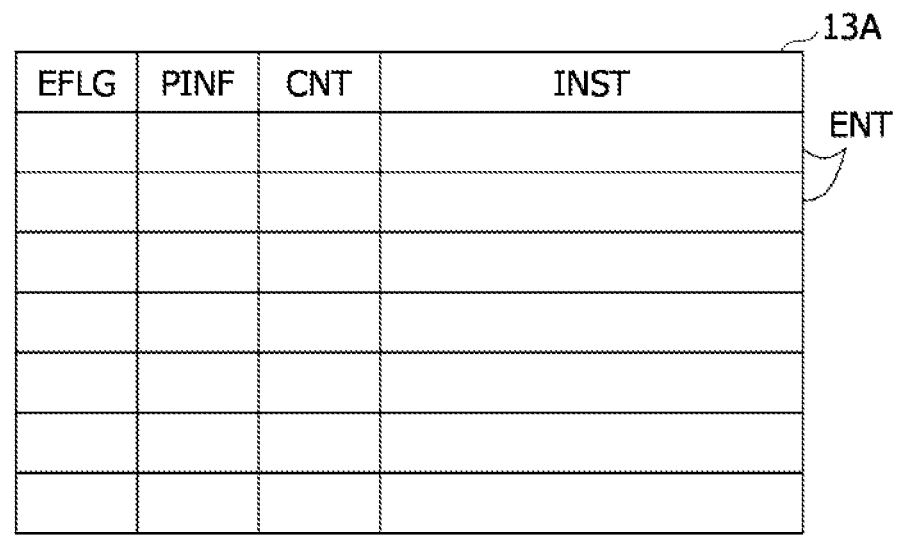

The commit control unit 12A includes an entry buffer 13A including a plurality of entries each holding information indicating an instruction for which execution by the arithmetic control unit 20A has been completed. An example of the entry buffer 13A is illustrated in FIG. 7. The commit control unit 12A has a similar function to the commit control unit 12 in FIG. 1. Note that the commit control unit 12A controls a commit of an instruction on the basis of a completion signal CMPLa or CMPLb for each pipeline PLa or PLb and an error signal REUa, REUb, REUTa, REUTb, REUT2*a*, or REUT2*b*.

In a case of receiving either the error signal REUTa or REUT2*a* from the arithmetic unit 23A, the commit control unit 12A refers to the entry determination table 14A and detects an instruction that has caused the error in the arithmetic unit 23A. In a case of receiving either the error signal REUTb or REUT2*b* from the arithmetic unit 23B, the commit control unit 12A refers to the entry determination table 14A and detects an instruction that has caused the error in the arithmetic unit 23B.

The execution control unit 21A has a similar function to the execution control unit 21 in FIG. 1 except that the execution control unit 21A inputs the instruction supplied from the reservation station 11 to at least either the arithmetic unit 23A or 23B. That is, the execution control unit 21A determines the pipeline PLa or PLb to which the instruction is to be input for each instruction, and determines a register to be used for an operation in the register file 22A. The register file 22A has a similar configuration to the register file 22 in FIG. 1 except that the register file 22A outputs operands to each of the pipelines PLa and PLb.

The arithmetic units 23A and 23B have the same arithmetic functions as the arithmetic unit 23 in FIG. 1, and are examples of arithmetic units. The arithmetic unit 23A outputs a completion signal CMPLa to the instruction control unit 10A in a U cycle on the basis of completion of the operation, and stores an operation result RSLTa in the reorder buffer 24A. Furthermore, in a case of detecting an error before the U cycle is completed, the arithmetic unit 23A outputs the error signal REUa to the instruction control unit 10A in the U cycle. In a case of detecting an error in a UT cycle, the arithmetic unit 23A outputs the error signal REUTa to the instruction control unit 10A. In a case of detecting an error in a UT2 cycle, the arithmetic unit 23A outputs the error signal REUT2a to the instruction control unit 10A.

The arithmetic unit 23B outputs a completion signal CMPLb to the instruction control unit 10A in the U cycle on the basis of completion of the operation, and stores an operation result RSLTb in the reorder buffer 24A. Furthermore, in the case of detecting an error before the U cycle is completed, the arithmetic unit 23B outputs the error signal REUb to the instruction control unit 10A in the U cycle. In a case of detecting an error in the UT cycle, the arithmetic unit 23B outputs the error signal REUTb to the instruction control unit 10A. In a case of detecting an error in the UT2 cycle, the arithmetic unit 23B outputs the error signal REUT2b to the instruction control unit 10A.

The reorder buffer 24A has a similar function to the reorder buffer 24 of FIG. 1 except that the reorder buffer 24A receives the operation results RSLTa and RSLTb from the arithmetic units 23A and 23B, respectively. For example, the reorder buffer 24A stores the operation result RSLT to be committed in the register file 22A on the basis of a write enable signal WE from the commit control unit 12A.

FIG. 6 illustrates an example of the entry determination table 14A in FIG. 5. Detailed description of elements similar to those in the entry determination table 14 in FIG. 1 is omitted. The entry determination table 14A includes entries each including pipe information PINF of "0" or "1" and a count value CNT of "1" or "2", for each of the error signal names REUa, REUb, REUT2a, and REUT2b. The pipe information PINF and the count value CNT held in the entry determination table 14A are fixed values and correspond to pipe information PINF and the count value CNT stored in the entry buffer 13A.

As illustrated in FIG. 6, the entry determination table 14A includes the entry that holds the pipe information PINF and the count value CNT corresponding to the error signal name. Therefore, the entry determination table 14 can be easily changed by increasing or decreasing the number of entries corresponding to the increase or decrease in the number of pipeline PLs or the increase or decrease in the number of error signal lines. At this time, change of the entry buffer 13 is not needed.

FIG. 7 illustrates an example of the entry buffer 13A in FIG. 5. The entry buffer 13A is an example of a holding unit. The entry buffer 13A is similar to the entry buffer 13 in FIG. 2 except that each entry ENT has a pipe information area PINF for holding the pipe information PINF. That is, the entry buffer 13A includes a plurality of entries ENT each holding an error flag EFLG, the pipe information area PINF, a count area CNT, and an instruction information area INST. The pipe information PINF is information that identifies whether the operation has been executed in the pipeline PLa or PLb. For example, "0" indicates the pipeline PLa and "1" indicates the pipeline PLb.

In a case of receiving the completion signal CMPLa (or CMPLb), the commit control unit 12A stores instruction information INST indicating an instruction corresponding to the completion signal CMPLa (or CMPLb) to one of the entries ENT. Furthermore, the commit control unit 12A resets the count area CNT of the entry ENT in which the instruction information INST has been stored to "0". Moreover, the commit control unit 12A stores the pipe information PINF indicating the pipeline PL that has executed the instruction in the entry ENT storing the instruction information INST on the basis of the received completion signal CMPLa (or CMPLb).

In a case of receiving the error signal REUa together with the completion signal CMPLa from the arithmetic unit 23A, the commit control unit 12A determines that an error has occurred in the instruction for which execution of the operation has been completed by the pipeline PLa. In a case of receiving the error signal REUb together with the completion signal CMPLb from the arithmetic unit 23B, the commit control unit 12A determines that an error has occurred in the instruction for which execution of the operation has been completed by the pipeline PLb. Then, the commit control unit 12A sets the error flag EFLG of the entry ENT holding the instruction information INST indicating the instruction in which the error has occurred.

In the case of receiving the error signal REUTa (or REUT2a), the commit control unit 12A refers to the entry determination table 14A and reads the pipe information PINF and the count value CNT corresponding to the error signal REUTa (or REUT2a). Furthermore, in the case of receiving the error signal REUTb (or REUT2b), the commit control unit 12A refers to the entry determination table 14A and reads the pipe information PINF and the count value CNT corresponding to the error signal REUTb (or REUT2b).

Then, the commit control unit 12 sets the error flag EFLG of the entry ENT holding the read pipe information PINF and count value CNT. The commit control unit 12 determines that the instruction information INST held by the entry ENT with the set error flag EFLG is the instruction in which the error has occurred.

Note that, in a case where the entry ENT holding both the pipe information PINF and the count value CNT read from the entry determination table 14A is not present in the entry buffer 13, the commit control unit 12A detects occurrence of a non-retryable error. Whether the non-retryable error has occurred in the pipeline PLa or PLb is determined according to the pipe information PINF. In the case of detecting occurrence of the non-retryable error, the commit control unit 12 notifies a management device that manages the CPU 100 of an error ERR.

FIG. 8 illustrates an example of an operation of the CPU 100A in FIG. 5 as a state transition of the entry buffer 13A. Detailed description of operations similar to those in FIG. 4 is omitted. In FIG. 8, instructions A, B, C, and D are sequentially decoded, and the reservation station 11 inputs the instructions C and D to the pipelines PLa and PLb, respectively, in consideration of data dependency, and then inputs the instructions A and B to the pipelines PLa and PLb, respectively. FIG. 8 illustrates an example in which an error does not occur at the time of executing the instructions A to D, and illustrate the state of the entry buffer 13A from the U cycle of the instructions A and B.

In (a) of FIG. 8, the commit control unit 12A stores the instruction A, the count value CNT of "0", and the pipe information PINF of "0" indicating execution in the pipeline PLa in one of the entries ENT on the basis of the completion signal CMPL (U cycle) of the instruction A. Furthermore, the commit control unit 12A stores the instruction B, the count value CNT of "0", and the pipe information PINF of "1" indicating execution in the pipeline PLb in one of the entries ENT on the basis of the completion signal CMPL (U cycle) of the instruction B.

Moreover, the commit control unit 12A increments the respective count values CNT of the entries ENT holding the instructions C and D, and sets the count values CNT to "1". Note that the entries ENT holding the instructions C and D hold the pipe information PINF of "0" indicating execution in pipeline PLa, and the pipe information PINF of "1" indicating execution the in pipeline PLb, respectively.

Next, in (b) of FIG. 8, the commit control unit 12A increments the count values CNT of the entries ENT holding the instructions A and B. Then, the commit control unit 12A commits the instruction A in an earlier description order of a program between the instructions A and B in the UT cycle. Furthermore, the commit control unit 12A increments the count values CNT of the entries ENT holding the instructions C and D. After that, the information stored in the entry ENT holding the instruction A is deleted by the commit of the instruction A.

Next, in (c) of FIG. 8, the commit control unit 12A increments the count values CNT of the entries ENT holding the instructions B, C, and D. Then, the commit control unit 12A commits the instruction B in the earliest description order of a program among the instructions B, C, and D. After that, the information stored in the entry ENT holding the instruction B is deleted by the commit of the instruction B.

In (d) and (e) of FIG. 8, the commit control unit 12A increments the count value CNT of each valid entry ENT, and sequentially commits the instructions C and D in the earlier description order of the program, similarly to (c) of FIG. 8. Then, execution of the instructions A to D is completed.

FIG. 9 illustrates another example of the operation of the CPU 100A in FIG. 5 as a state transition of the entry buffer 13A. Detailed description of operations similar to those in FIG. 8 is omitted. The state of (a) of FIG. 9 is the same as the state of (a) of FIG. 8.

The state of (b) of FIG. 9 is similar to the state of (b) of FIG. 8 except that an error occurs in the UT2 cycle of the instruction C. In (b) of FIG. 9, the commit control unit 12A receives the error signal REUT2a indicating occurrence of an error in the UT2 cycle in the pipeline PLa. The commit control unit 12A refers to the entry holding the error signal REUT2a in the entry determination table 14A, and sets the error flag EFLG of the entry ENT holding the instruction C with the pipe information PINF of "0" and the count value CNT of "2" to "1". Note that the instruction A in the earlier description order of the program is committed between the instructions A and B in the UT cycle, similarly to (b) of FIG. 8.

The state of (c) of FIG. 9 is similar to the state of (c) of FIG. 8 except that the error flag EFLG of the entry ENT holding the instruction C is set. The instruction B in the UT2 cycle is committed because an error has not been occurred and an entry holding an instruction in an earlier description order than the instruction B is not present. In (d) of FIG. 9, since the error flag EFLG is set in the entry ENT holding the instruction C in an early description order, the commit control unit 12A determines retries of the instruction C and the instruction D in the description order later than the instruction C.

Note that even in a case where the error flags EFLG of the instructions C and D are set in (b) of FIG. 9, the retries of the instructions C and D are determined in (d) of FIG. 9. Furthermore, in (b) of FIG. 9, in a case where only the error flag EFLG of the instruction D is set, the instruction C is committed and then the retry of the instruction D is determined in (d) of FIG. 9. Note that, in the past, in a case where an error occurs in the UT2 cycle, the error ERR (non-retry error) has been notified to the management device without determining whether to retry.

FIG. 10 illustrates still another example of the operation of the CPU 100A in FIG. 5 as a state transition of the entry buffer 13A. Detailed description of operations similar to those in FIG. 8 and FIG. 9 is omitted. The state of (a) of FIG. 10 is the same as the state of (a) of FIG. 8.

The state of (b) of FIG. 10 is similar to the state of (b) of FIG. 9 except that an error occurs in the UT cycle of the instruction B. In (b) of FIG. 10, the commit control unit 12A receives the error signal REUTb indicating occurrence of an error in the UT cycle in the pipeline PLb, and the error signal REUT2a indicating occurrence of an error in the UT2 cycle in the pipeline PLa. The commit control unit 12A refers to the entry holding the error signal REUTb in the entry determination table 14A, and sets the error flag EFLG of the entry ENT holding the instruction B with the pipe information PINF of "1" and the count value CNT of "1" to "1". The point that the error flag EFLG of the entry ENT holding the instruction C is set to "1" is the same as in (b) of FIG. 9.

In (c) of FIG. 10, since the error flag EFLG is set in the entry ENT holding the instruction B in the early description order, the commit control unit 12A determines retries of the instruction B, and the instructions C and D in the description order later than the instruction B. Note that even in a case where the error flags EFLG of the instructions C and D are set in (b) of FIG. 10, the retries of the instructions B, C, and D are determined in (c) of FIG. 10.

In the past, in a case where an error of the instruction B occurs in the UT cycle, the commit of the instruction A in the same UT cycle is suppressed, and the instructions A to D are retried. In this case, the number of instructions to be retried increases, and thus the processing efficiency of the instructions decreases. In other words, the CPU 100A can suppress a decrease in the processing efficiency of the instructions by the operation illustrated in FIG. 10.

FIG. 11 illustrates another example of the operation of the CPU 100A in FIG. 5 as a state transition of the entry buffer 13A. Detailed description of operations similar to those in FIG. 10 is omitted. The state transition of the entry buffer 13A illustrated in FIG. 11 is the same as the state transition in FIG. 10. However, in (c) of FIG. 11, an error occurs in the UT2 cycle of the instruction A committed in (b) of FIG. 11.

Specifically, in (c) of FIG. 11, the commit control unit 12A receives the error signal REUT2a indicating occurrence of an error in the UT2 cycle in the pipeline PLa. The commit control unit 12A refers to the entry holding the error signal REUT2a in the entry determination table 14A, and searches for the entry ENT with the pipe information PINF of "0" and the count value CNT of "2".

Since the entry ENT to be searched is not present, the commit control unit 12A detects occurrence of a non-retryable error (non-retry error) and notifies the management device of the error ERR. As described above, in the case of receiving the error signal REUT2a (or REUT2b), the commit control unit 12A can determine whether a non-retryable error has occurred or a retryable error has occurred on the basis of the information held in the entry buffer 13A. Then, the commit control unit 12A can execute processing according to the determination result.

FIG. 12 illustrates another example of an operation of the CPU 100A in FIG. 5 as a state transition of the entry buffer 13A. Detailed description of operations similar to those in FIG. 8 is omitted. The state of (a) of FIG. 12 is the same as the state of (a) of FIG. 8.

The state of (b) of FIG. 12 is similar to the state of (b) of FIG. 8 except that an error occurs in the UT cycle of the instruction A. In (b) of FIG. 12, the commit control unit 12A receives the error signal REUTa indicating occurrence of an error in the UT cycle in the pipeline PLa. The commit control unit 12A refers to the entry holding the error signal REUTa in the entry determination table 14A, and sets the error flag EFLG of the entry ENT holding the instruction A with the pipe information PINF of "0" and the count value CNT of "1" to "1". In this case, the commit control unit 12A determines retries of the instructions A to D.

Figure 13:
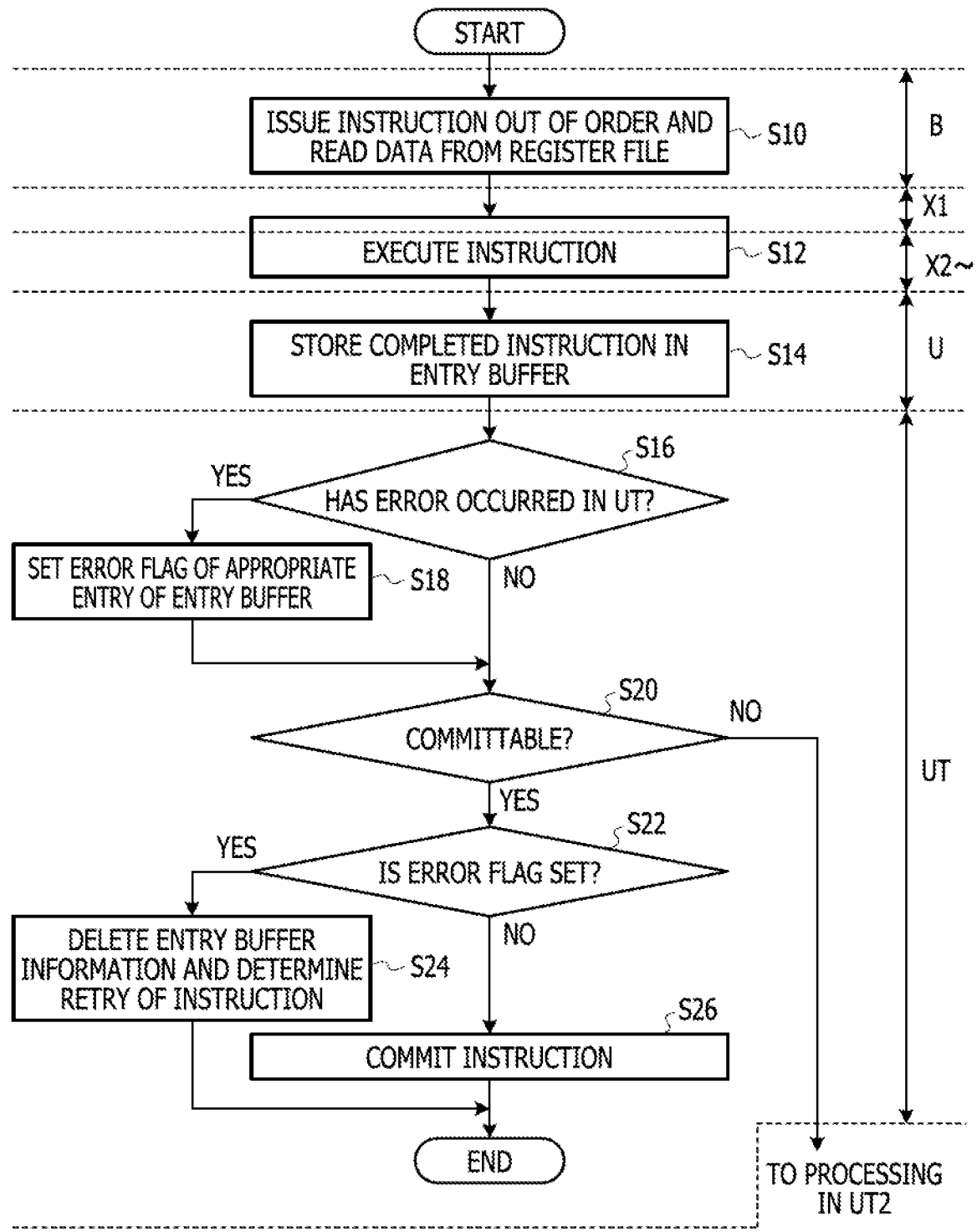
FIG. 13 is a flowchart illustrating an example of the operation for each cycle of the CPU in FIG. 5.
Figure 14:
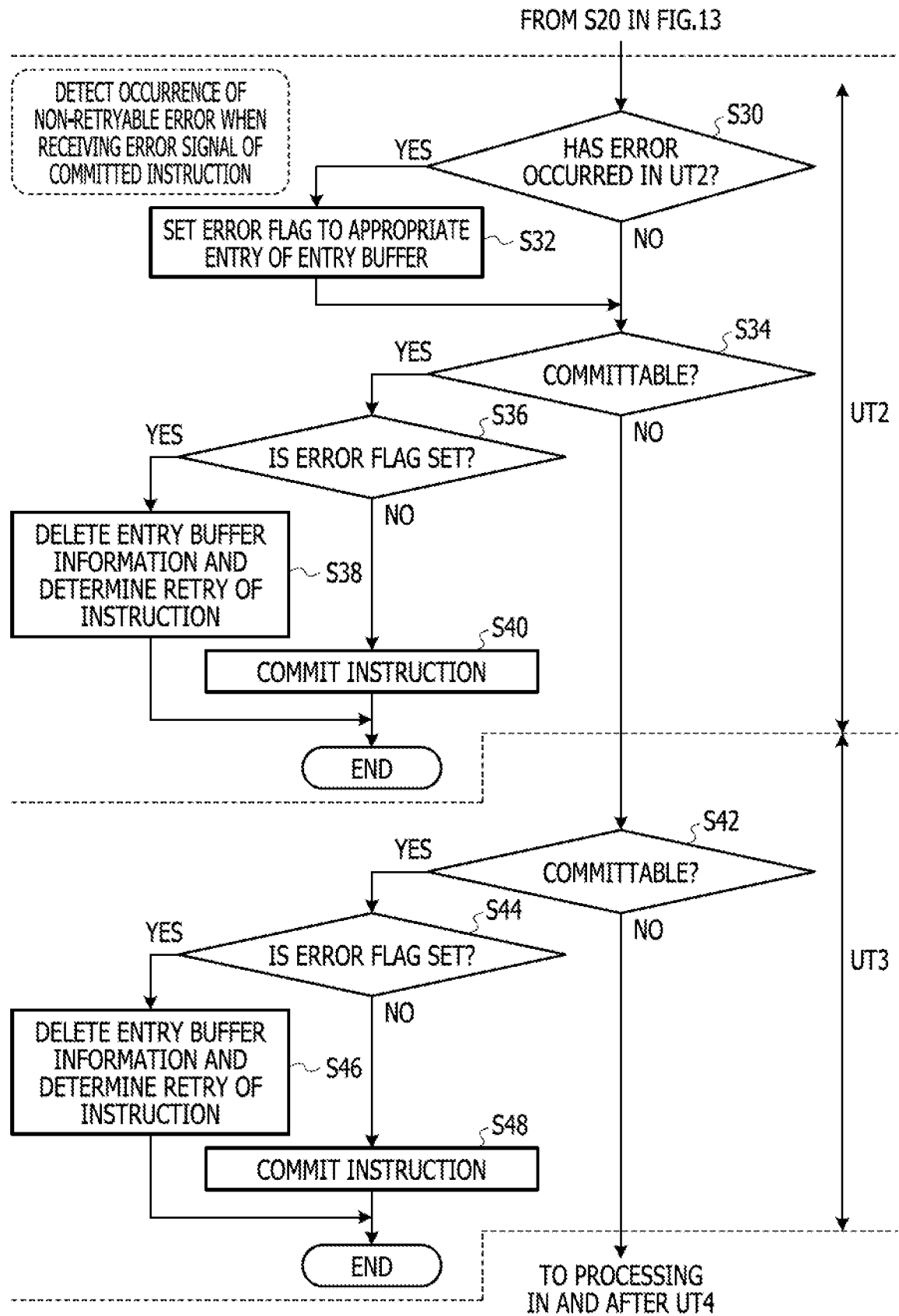
FIG. 14 is a flowchart illustrating a continuation of FIG. 13.

FIGS. 13 and 14 illustrate an example of the operation of the CPU 100A in FIG. 5 for each cycle. The flows illustrated in FIGS. 13 and 14 are executed for each instruction.

First, in the B cycle, step S10 is executed. In step S10, the reservation station 11 issues an instruction out of order, and the execution control unit 21A reads data to be used for the operation from the register file 22A and supplies the data to the pipeline PLa (or PLb). Then, in the X1 cycle and subsequent execution cycles X, step S12 is executed. In step S12, the arithmetic unit 23A (or 23B) executes the instruction by operating the data read from the register file 22A.

Next, in the U cycle, step S14 is executed. In step S14, the arithmetic unit 23A (or 24B) outputs the operation result RSLT to the reorder buffer 24A, and outputs the completion signal CMPLa (or CMPLb) to the commit control unit 12A. The commit control unit 12A stores the information of the instruction for which execution has been completed corresponding to the completion signal CMPL in one of the entry ENTs of the entry buffer 13A. For example, the commit control unit 12A stores the pipe information PIN F, the count value CNT of "0", and the instruction information INST in the entry ENT.

Note that, in step S14 (U cycle), when the commit control unit 12A sets the error flag EFLG of the entry ENT holding the instruction information INST that has caused an error in the entry buffer 13A in the case of receiving the error signal REUa or REUb.

Next, in the UT cycle, steps S16 to S26 are executed. In step S16, the commit control unit 12A executes step S18 in the case where an error occurs in the arithmetic unit 23A (or 23B) in the UT cycle. In step S18, the commit control unit 12A detects the instruction that has caused the error on the basis of the information stored in the entry determination table 14A and the entry buffer 13A. Then, the commit control unit 12A sets the error flag EFLG of the entry ENT holding the instruction information INST that has caused the error in the entry buffer 13A.

In a case where no error has occurred by the UT cycle or after the execution of step S18, in step S20, the commit control unit 12A determines whether an instruction is committable. For example, in the case where an instruction in the earliest description order in the program among uncommitted instructions is held in the entry buffer 13A (top of queue), the commit control unit 12A determines that the instruction is committable. The commit control unit 12A executes the UT2 cycle processing illustrated in FIG. 14 in the case where an instruction is not committable.

In the case where an instruction is committable, in step S22, the commit control unit 12A determines whether the error flag EFLG of the entry ENT storing the instruction is set in the entry buffer 13A.

In the case where the error flag EFLG of the instruction is set, in step S24, the commit control unit 12A deletes all the information of the instructions for which execution has been completed and held in the entry buffer 13A, and determine retries of the deleted instructions. In the case where the error flag EFLG of the instruction is not set, in step S26, the commit control unit 12A commits the instruction and terminates the execution cycle of the instruction.

In the UT2 cycle in FIG. 14, steps S30 to S40 are executed. In step S30, the commit control unit 12A executes step S32 in the case where an error occurs in the arithmetic unit 23A (or 23B) in the UT2 cycle. In step S32, the commit control unit 12A detects the instruction that has caused the error on the basis of the information stored in the entry determination table 14A and the entry buffer 13A. Then, the commit control unit 12A sets the error flag EFLG of the entry ENT holding the instruction information INST that has caused the error in the entry buffer 13A.

In the case where no error has occurred in the UT2 cycle or after execution of step S32, in step S34, the commit control unit 12A determines whether an instruction is committable similar to step S20, and executes the processing in the UT3 cycle in the case where an instruction is not committable. In the case where an instruction is committable, in steps S36, S38, and S40, the commit control unit 12A executes processing similar to the processing in steps S22, S24, and S26 in FIG. 13.

In the UT3 cycle, steps S42, S44, S46, S48 are executed. In step S42, whether an instruction is committable is determined, and the UT4 cycle processing is executed in the case where an instruction is not committed. In the case where an instruction is committable, in steps S44, S46, and S48, the commit control unit 12A executes processing similar to the processing in steps S22, S24, and S26 in FIG. 13. In the UT4 cycle and subsequent cycles, similar processing to the processing in the UT3 cycle is executed.

Note that, in the UT2 cycle, in the case of receiving the error signal LEUT2a or LEUT2b of a committed instruction, the commit control unit 12A is not able to specify the instruction that has caused the error, using the entry determination table 14A. In this case, as described in (c) of FIG. 11, the commit control unit 12A detects occurrence of a non-retryable error (non-retry error) and notifies the management device of the error ERR.

As described above, in the embodiment illustrated in FIGS. 5 to 14, similar effects to those in the embodiment illustrated in FIG. 1 to FIG. 4 can be obtained. Moreover, in the embodiment illustrated in FIGS. 5 to 14, each entry ENT of the entry buffer 13A is provided with the area that holds the pipe information PINF, whereby the retryable instruction can be determined independently for each pipeline PLa or Pipeline PLb. Therefore, for example, in the case where the instruction executed in the pipeline PLa is determined to be retryable, the retryable instruction executed in the pipeline PLb being determined to be non-retryable can be suppressed. Therefore, the retryable error being notified to the management device of the CPU 100A as a non-retry error can be suppressed, and occurrence of a system error can be suppressed. As a result, the reliability of the system including the CPU 100A can be improved, and the processing performance can be improved.

By searching the entry buffer 13A using the entry determination table 14A, the instruction in which an error has occurred can be detected for each pipeline PL on the basis of the error signal transmitted to the error signal line (REUTa, REUTb, or the like). As a result, the error flag EFLG can be set for each of the pipelines PLa and PLb, and the retryable instruction can be determined.

Note that, in the above-described embodiments, an example of detecting the cycle count (count value CNT) of occurrence of an error using the entry determination table 14 on the basis of the error signal REUT or REUT2, specifying an instruction in which the error has occurred, and determining whether the instruction is retryable has been described. Furthermore, an example of detecting the count value CNT and the pipe information PINF using the entry determination table 14A on the basis of the error signal REUTa, REUTb, REUT2a, or REUT2b, specifying an instruction in which the error has occurred and the arithmetic unit, and determining whether the instruction is retryable has been described.

However, the method for the specification of an instruction in which the error has occurred and the determination as to whether the instruction is retryable is not limited to the method described in the above embodiments. For example, it is sufficient that information that can specify an instruction in which an error has occurred and the arithmetic unit can be output from the arithmetic unit 23, 23A, or 23B, and the commit control unit 12 or 12A can determine whether the instruction is retryable for each instruction on the basis of the received information.

Furthermore, in the above-described embodiments, an example of outputting the error signal REU in the U cycle in the case of detecting an error by the completion of the U cycle has been described. However, for example, in a case of detecting an error in the X cycle (X1, X2, or the like), the error signal may be output for each cycle.

Figure 15:
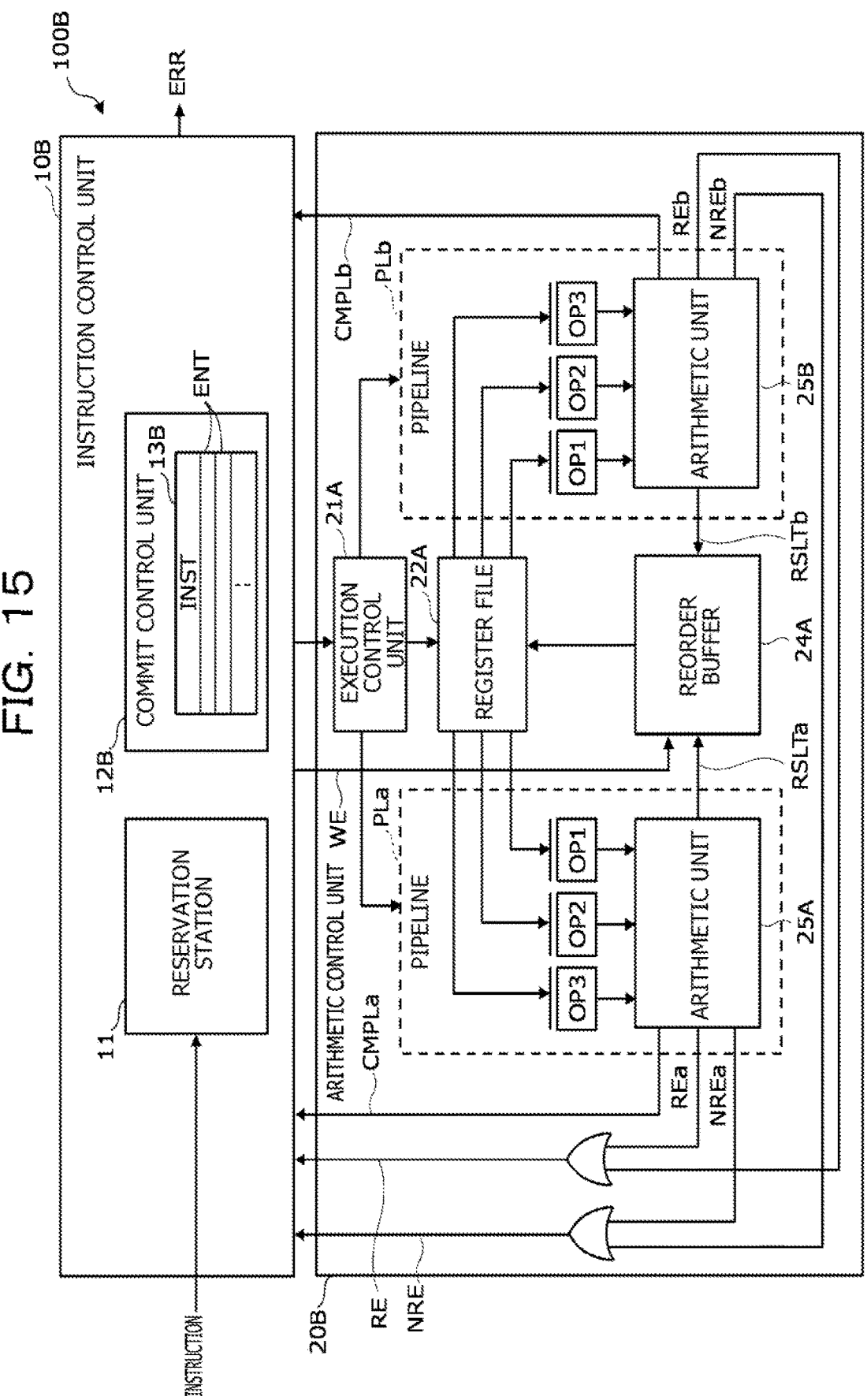
FIG. 15 is a block diagram illustrating an example (comparative example) of another semiconductor device.

FIG. 15 illustrates an example (comparative example) of another semiconductor device. Elements similar to those in FIGS. 1 and 5 are denoted by the same reference numerals, and detailed description is omitted. A semiconductor device 100B illustrated in FIG. 15 is, for example, a processor such as a CPU, and includes an instruction control unit 10B and an arithmetic control unit 20B.

The instruction control unit 10B includes a reservation station 11 and a commit control unit 12B. The commit control unit 12B includes an entry buffer 13B including a plurality of entries ENTs each holding instruction information INST of an instruction for which execution has been completed until the instruction is committed. The arithmetic control unit 20B includes an execution control unit 21A, a register file 22A, a plurality of pipelines PL (PLa and PLb), and a reorder buffer 24A. The pipeline PLa includes an arithmetic unit 25A instead of the arithmetic unit 23A in FIG. 5, and the pipeline PLb includes an arithmetic unit 25B instead of the arithmetic unit 23B in FIG. 5.

The arithmetic unit 25A outputs a completion signal CMPLa to the instruction control unit 10B in a U cycle on the basis of completion of an operation, and stores an operation result RSLTa in the reorder buffer 24A. Furthermore, in a case of detecting an error before a UT cycle is completed, the arithmetic unit 25A outputs a retry error signal REa in the UT cycle. In a case of detecting an error in a UT2 cycle, the arithmetic unit 25A outputs a non-retry error signal NREa.

The arithmetic unit 25B outputs a completion signal CMPLb to the instruction control unit 10B in the U cycle on the basis of completion of the operation, and stores an operation result RSLTb in the reorder buffer 24A. Furthermore, in a case of detecting an error before the UT cycle is completed, the arithmetic unit 25B outputs a retry error signal REb in the UT cycle. In a case of detecting an error in the UT2 cycle, the arithmetic unit 25B outputs a non-retry error signal NREb.

In a case where either the retry error signal REa or REb is output, the arithmetic control unit 20B outputs the retry error signal RE to the instruction control unit 10B. In a case where either the non-retry error signal NREa or NREb is output, the arithmetic control unit 20B outputs the non-retry error signal NRE to the instruction control unit 10B.

In the case of receiving the retry error signal RE, the commit control unit 12B deletes information of the instructions for which execution has been completed and held in the entry buffer 13A, and determines retries of the deleted instructions. That is, in the case where an error has been detected by the arithmetic unit 25A (or 25B) by the UT cycle, the instruction control unit 10B determines that the instructions are retryable, and executes retries of the instructions.

In the case of receiving the non-retry error signal NRE, the commit control unit 12B notifies a management device that manages the CPU 100B of an error ERR because a non-retryable error has occurred in the arithmetic unit 25A (or 25B). That is, the instruction control unit 10B notifies the management device of the error ERR in the case where the arithmetic unit 25A (or 25B) has detected the non-retryable error in the UT2 cycle.

Figure 16:
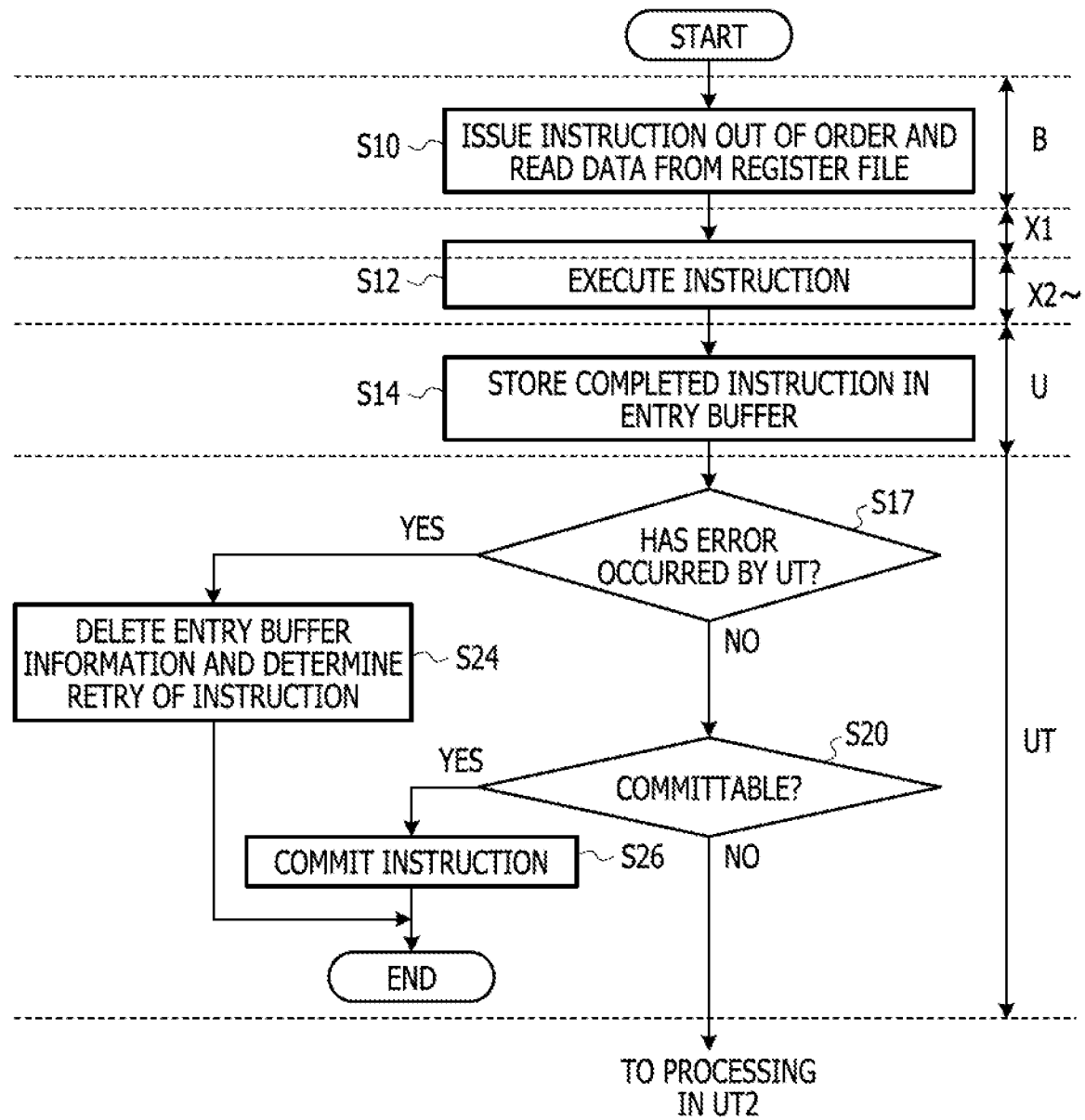
FIG. 16 is a flowchart illustrating an example of an operation for each cycle of a CPU in FIG. 15.
Figure 17:
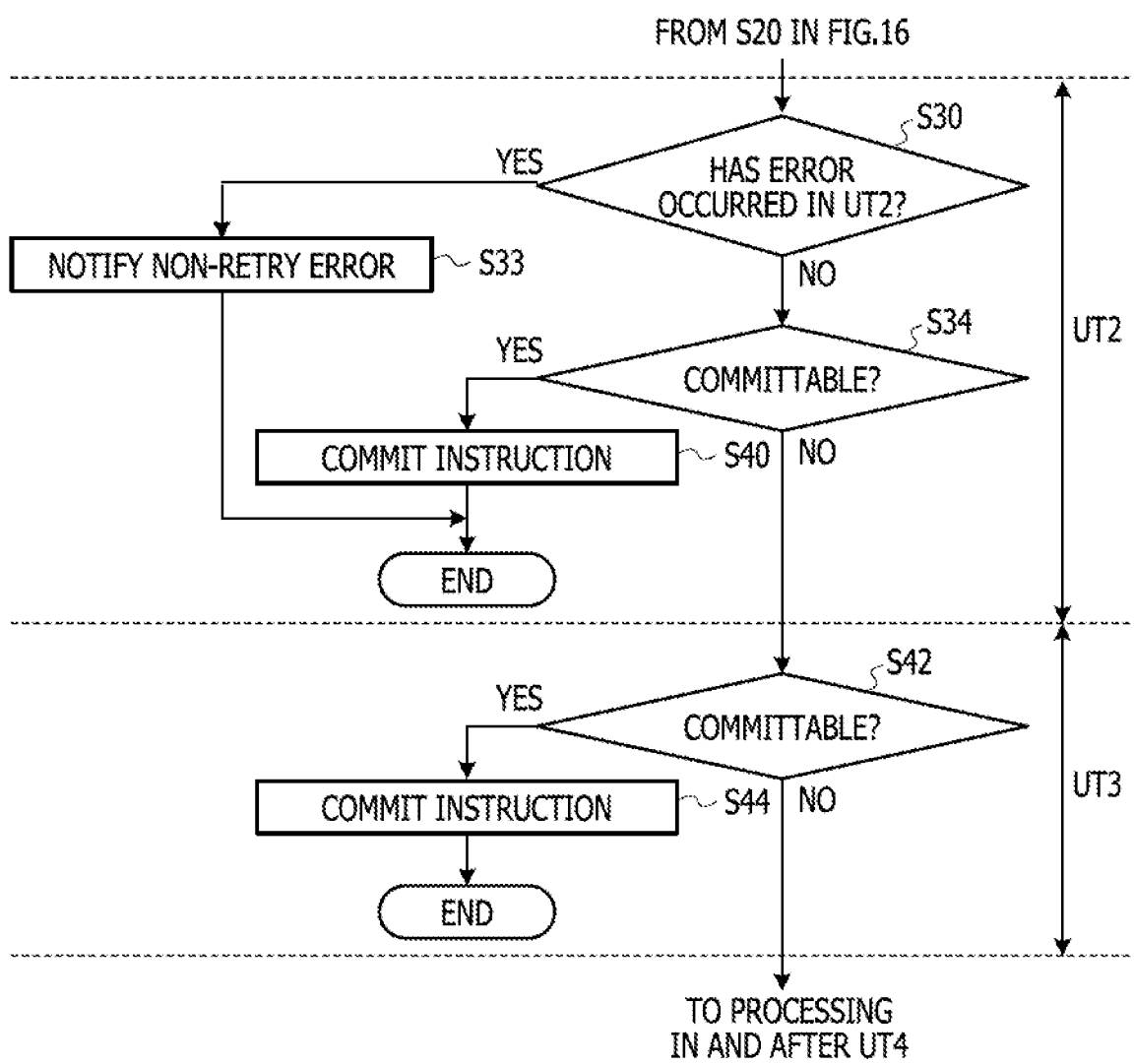
FIG. 17 is a flowchart illustrating a continuation of FIG. 16.

FIGS. 16 and 17 illustrate an example of an operation of the CPU 100B in FIG. 15 for each cycle. Operations similar to those in FIGS. 13 and 14 are denoted by the same reference numerals, and detailed description is omitted. The flow illustrated in FIGS. 16 and 17 is executed for each instruction. In FIG. 16, the operation of steps S10 to S14 (cycle B to cycle U) is similar to the operation in FIG. 13. Note that, since the arithmetic units 25A and 25B do not output an error signal in the U cycle, the commit control unit 12B does not execute the processing associated with an error in step S14.

In step S17 after step S14, the commit control unit 12B executes step S24 in the case where an error occurs in the arithmetic unit 25A (or 25B) in the UT cycle. In step S24, the commit control unit 12B deletes all the instructions held in the entry buffer 13B, determines retries of the deleted instructions, and terminates the execution cycle of the instructions.

In a case where no error has occurred by the UT cycle, in step S20, the commit control unit 12B determines whether an instruction is committable, and commits the instruction in step S26 in the case where the instruction is committable. The commit control unit 12B executes the UT2 cycle processing illustrated in FIG. 17 in the case where the instruction is not committable.

In step S30 in FIG. 17, the commit control unit 12B determines an error by which retry of an instruction is not possible has occurred in the case where an error has occurred in the arithmetic unit 25A (or 25B) in the UT2 cycle, and executes step S33. In step S33, the commit control unit 12B notifies the management device of the error ERR (occurrence of a non-retry error), and terminates the execution cycle of the instruction.

In the case where no error has occurred by the UT2 cycle, in step S34, the commit control unit 12B determines whether an instruction is committable. In the case where the instruction is committable, in step S40, the commit control unit 12B commits the instruction and terminates the execution cycle of the instruction. The commit control unit 12B executes the UT3 cycle processing illustrated in the case where the instruction is not committable. The processing in and after the UT3 cycle is similar to the processing in FIG. 14.

From the above detailed description, characteristics and advantages of the embodiments will become clear. This is intended to cover the features and advantages of the embodiments described above without departing from the spirit and the scope of the claims. Furthermore, any person having ordinary knowledge in the technical field can be easily come up with various improvements and modifications. Therefore, there is no intention to limit the scope of the inventive embodiments to those described above, and the scope of the inventive embodiments can rely on appropriate improvements and equivalents included in the scope disclosed in the embodiments.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An arithmetic processing device, comprising:
   a memory; and
   a processor coupled to the memory and the processor configured to:
   execute arithmetic processing which executes a plurality of instructions issued out of order,
   execute control processing which commits the plurality of instructions for which execution has been completed in order,
   identify, for each instruction included in the plurality of instructions, a count value which indicates a number of cycles from when execution of the instruction has been completed, and
   identify, among a plurality of uncommitted instructions, a specific instruction to be retried, the specific instruction having the count value which matches a specific cycle in which an error is detected in the arithmetic processing among the number of cycles.

2. The arithmetic processing device according to claim 1, wherein the processor configured to:
   commit a committable instruction except for the instruction determined to be retried among the plurality of uncommitted instructions, and
   determine retry of a non-committed instruction.

3. The arithmetic processing device according to claim 1, wherein the processor configured to:
   hold, for each instruction, the instruction for which execution has been completed, the count value that indicates a cycle count from when the execution of the instruction has been completed, and error information;
   store the error information in an entry each time an error signal is received, and
   determine that an instruction held in the entry that holds the error information is retry when committing each instruction.

4. The arithmetic processing device according to claim 3, wherein the processor configured to
   detect occurrence of a non-retry error in a case where a same count value as the detection cycle indicated by the error signal is not present in the entry.

5. An arithmetic processing device, comprising:
   a memory;
   a plurality of pipelines that each includes an arithmetic and capable of executing instructions in parallel;
   a plurality of error signal lines each connected to the arithmetic for each of the plurality of pipelines; and
   a processor coupled to the memory, the processor being configured to:
   execute arithmetic processing which executes a plurality of instructions issued out of order,
   execute control processing which commits the plurality of instructions for which execution has been completed in order,
   identify, for each instruction included in the plurality of instructions, a count value which indicates a number of cycles from when execution of the instruction has been completed,
   hold a plurality of entries that each holds, for each instruction, the instruction for which execution has been completed, the count value that indicates the cycle count from when the execution of the instruction has been completed, pipe information that indicates the pipeline that has executed the instruction, and error information,
   store, each time an error signal is received, the error information in the entry that holds a same count value as the detection cycle indicated by the error signal, and the pipe information that indicates the pipeline connected to the error signal line that has transmitted the error signal, and
   determine that an instruction held in the entry that holds the error information is to be retried before committing each instruction.

6. The arithmetic processing device according to claim 5, wherein the processor configured to:
   store an entry determination table configured to hold the pipe information that indicates the pipeline to which the error signal is output and the detection cycle of an error in association with the plurality of error signal lines, and
   when receiving the error signal, store the error information in the entry that holds same pipe information and number of cycles as the pipe information and the detection cycle held in the entry determination table corresponding to the error signal line to which the error signal is transmitted.

7. The arithmetic processing device according to claim 5, wherein the processor configured to
   when the entry does not have information that matches the detection cycle indicated by the error signal and the pipe information indicating the pipeline that outputs the error signal, detect an occurrence of an error that does not retry.

8. The arithmetic processing device according to claim 7, wherein the processor configured to
   notify a management device that manages an operation of the semiconductor device of the error in a case where occurrence of the non-retry error is detected.

9. A semiconductor device comprising:
   an arithmetic configured to execute arithmetic processing which executes a plurality of instructions issued out of order;
   a buffer configured to store a plurality of instructions for which execution has been completed, the plurality of instructions being committed in order; and
   a signal line configured to transmit, for each instruction included in the plurality of instructions, a signal which indicates a number of cycles in which an error is detected in the arithmetic processing, wherein
   a specific instruction, among a plurality of uncommitted instructions, is identified for retry, the specific instruction having a count value which matches a specific cycle in which an error is detected in the arithmetic processing among the number of cycles, and
the count value indicates the number of cycles from when execution of the instruction has been completed.

* * * * *